United States Patent
Phadke

(10) Patent No.: US 10,014,771 B2
(45) Date of Patent: Jul. 3, 2018

(54) SWITCHING SHUNT REGULATOR CIRCUITS

(71) Applicant: Astec International Limited, Kowloon (HK)

(72) Inventor: Vijay Gangadhar Phadke, Pasig (PH)

(73) Assignee: ASTEC INTERNATIONAL LIMITED, Kwun Tong, Kowloon (HK)

(*) Notice: Subject to any disclaimer, the term of this patent is extended or adjusted under 35 U.S.C. 154(b) by 133 days.

(21) Appl. No.: 14/559,329

(22) Filed: Dec. 3, 2014

(65) Prior Publication Data

US 2015/0162833 A1  Jun. 11, 2015

Related U.S. Application Data

(60) Provisional application No. 61/913,053, filed on Dec. 6, 2013.

(51) Int. Cl.
*H02M 3/158* (2006.01)
*H02M 1/00* (2006.01)

(52) U.S. Cl.
CPC .... *H02M 3/158* (2013.01); *H02M 2001/0045* (2013.01)

(58) Field of Classification Search
CPC .......... H02M 3/02; H02M 3/10; H02M 3/145; H02M 3/155; H02M 3/1555; H02M 3/156; H02M 3/1563; H02M 3/1566; H02M 3/157; H02M 3/158; H02M 3/1582; H02M 3/1584; H02M 3/1588; H02M 2001/0032; H02M 2001/0035; H02M 2001/0009; H02M 1/42; H02M 1/4225; H02M 2001/0045; Y02B 70/1466; Y02B 70/1425

USPC .............. 323/205–211, 222–226, 229–231, 323/269–277, 282–286, 311, 312, 351, 323/908; 363/15–21.18, 50, 52, 74, 363/123–127

See application file for complete search history.

(56) References Cited

U.S. PATENT DOCUMENTS

| 5,780,999 A * | 7/1998 | Dunne | H02M 3/155 323/222 |
| 6,184,667 B1* | 2/2001 | Lacey | H02M 3/1563 323/282 |
| 8,305,004 B2 | 11/2012 | Shao | |

(Continued)

OTHER PUBLICATIONS

Shao et al., TechZone, A Single-Stage Offline LED Driver for Incandescent Replacement, 4 pages, 2011.

(Continued)

*Primary Examiner* — Timothy J Dole
*Assistant Examiner* — Carlos Rivera-Perez
(74) *Attorney, Agent, or Firm* — Harness, Dickey & Pierce, P.L.C.

(57) ABSTRACT

A switching shunt regulator circuit includes a current source having an input for receiving an input voltage and an output for providing a DC current, and a shunt voltage regulator coupled to the output of the current source. The current source is configured to provide DC current to a DC load and DC current to the shunt voltage regulator when the DC load is coupled to the output. The DC current to the shunt voltage regulator regulates a voltage at the output. The shunt voltage regulator has a current carrying capacity greater than the sum of the DC current to the DC load and the DC current to the shunt voltage regulator.

16 Claims, 6 Drawing Sheets

(56) References Cited

U.S. PATENT DOCUMENTS

| | | | |
|---|---|---|---|
| 2010/0149840 A1* | 6/2010 | Hayasaki | H02M 3/3381 |
| | | | 363/21.09 |
| 2011/0156680 A1* | 6/2011 | Yeh | H02M 3/156 |
| | | | 323/282 |
| 2011/0316514 A1* | 12/2011 | Deboy | H02M 3/1584 |
| | | | 323/312 |
| 2013/0187619 A1* | 7/2013 | Dunipace | H02M 3/156 |
| | | | 323/225 |
| 2013/0264968 A1 | 10/2013 | Green | |
| 2014/0160801 A1* | 6/2014 | Stamm | H05B 33/0815 |
| | | | 363/21.01 |

OTHER PUBLICATIONS

Saint-Pierre, A Simple Low-Cost Non-Isolated Universal Input Off-Line Converter, 2002, 12 pages.

* cited by examiner

SWITCHING SHUNT REGULATOR CIRCUITS

CROSS-REFERENCE TO RELATED APPLICATION

This application claims the benefit of U.S. Provisional Application No. 61/913,053 filed Dec. 6, 2013. The entire disclosure of the above application is incorporated herein by reference.

FIELD

The present disclosure relates to switching shunt regulator circuits.

BACKGROUND

This section provides background information related to the present disclosure which is not necessarily prior art.

Digital control techniques may be used to replace analog circuits in electronics products such as simple home appliances that may incorporate intelligence and remote control functions. These intelligent features require microprocessors, which need stable bias power. Digital controlled power supplies also need microprocessors or digital signal processors to be energized first in order to allow controlled operation.

It is challenging to get a low voltage bias (e.g., 3.3 V) directly from a utility grid supply (e.g., 115 VAC, 230 VAC, etc.). For example, a typical single phase household energy meter may need only about 10 mA at 3.3 V. A buck converter may require an extremely small duty cycle to produce such a low voltage bias from a utility grid supply. Many applications do not allow a low side control switch operation for a converter, and a high side switch operation requires a high side drive and related difficulties in sensing the output voltage directly for the regulation. Indirect feedback during the freewheeling period does not offer tight voltage regulation needed for microprocessors. Using an optocoupler for regulation adds to cost and complexity for low power needs.

SUMMARY

This section provides a general summary of the disclosure, and is not a comprehensive disclosure of its full scope or all of its features.

According to one aspect of the present disclosure, a switching shunt regulator circuit includes a current source having an input for receiving an input voltage and an output for providing a DC current, and a shunt voltage regulator coupled to the output of the current source. The current source is configured to provide DC current to a DC load and DC current to the shunt voltage regulator when the DC load is coupled to the output. The DC current to the shunt voltage regulator regulates a voltage at the output. The shunt voltage regulator has a current carrying capacity greater than the sum of the DC current to the DC load and the DC current to the shunt voltage regulator.

According to another aspect of the present disclosure, a voltage regulating circuit includes an input for receiving a DC input voltage, an output for providing a DC output voltage, an inductor coupled to the output, a switch coupled in series between the input and the inductor, a shunt voltage regulator coupled in parallel with the output, a buffer coupled to the switch to provide a control signal to the switch, and a current sense coupled between the inductor and the buffer. The buffer is configured to turn on the switch when a sensed current though the inductor reaches a lower threshold, and to turn off the switch when the sensed current through the inductor reaches an upper threshold.

According to another aspect of the present disclosure, a method of controlling a switching shunt regulator circuit is disclosed. The circuit includes an input and an output, an inductor coupled to the output, a switch coupled in series between the input and the inductor, and a shunt voltage regulator coupled in parallel with the output. The method includes sensing a current through the inductor, turning on the switch when the sensed current reaches a lower input threshold, turning off the switch when the sensed current reaches an upper input threshold, and regulating a DC output voltage at the output using the shunt voltage regulator.

According to another aspect of the present disclosure, an integrated circuit voltage regulator includes an input for receiving a DC input voltage, an output for providing a DC output voltage, a shunt voltage regulator coupled in parallel with the output, an inductor coupled to the output, and an integrated circuit coupled between the input and the inductor. The integrated circuit includes a switch coupled in series between the input and the inductor, and a buffer coupled to the switch to provide a control signal to the switch. The integrated circuit voltage regulator also includes a current sense coupled between the inductor and the buffer. The buffer is configured to turn on the switch when a sensed current though the inductor reaches a lower threshold, and to turn off the switch when the sensed current through the inductor reaches an upper threshold.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
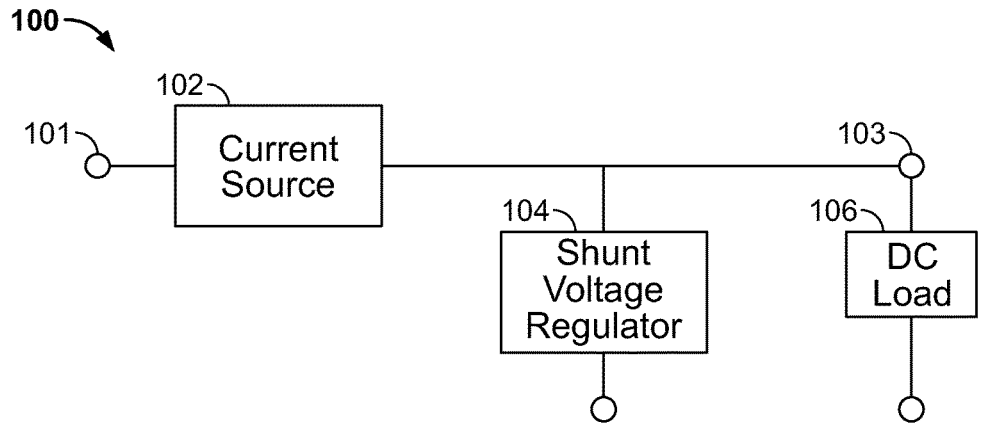
FIG. 1 is a block diagram of an example switching shunt regulator circuit according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A switching shunt regulator circuit according to one example embodiment of the present disclosure is illustrated in FIG. 1 and indicated generally by reference number 100. As shown in FIG. 1, the switching shunt regulator circuit 100 includes a current source 102 having an input 101 for receiving an input voltage and an output 103 for providing a DC current. The switching shunt regulator circuit 100 also includes a shunt voltage regulator 104 coupled to the output 103 of the current source 102. The current source 102 is configured to provide DC current to a DC load 106 and DC current to the shunt voltage regulator 104 when the DC load is coupled to the output 103. The DC current to the shunt voltage regulator 104 regulates a voltage at the output 103. The shunt voltage regulator 104 has a current carrying capacity greater than the sum of the DC current to the DC load and the DC current to the shunt voltage regulator 104.

The current source 102 may be any suitable current source, such as a linear current source, a switching current source, etc. Thus, the current source 102 may be any suitable power converter capable of providing a DC current output such as, for example, a buck converter, a forward converter, a push-pull converter, a half-bridge converter, a full-bridge converter, a boost converter, a buck-boost converter, etc. In some example embodiments, the switching shunt regulator circuit 100 is a non-isolated circuit (e.g., an isolation transformer is not employed).

The current source 102 may provide a DC current that is slightly greater than the amount of current needed by the DC load 106 coupled to the output 103 of the current source. Excess current from the current source 102 may be used by the shunt voltage regulator 104 to maintain the voltage at the output 103. The shunt voltage regulator 104 may be sized to handle all current produced by the current source 102. For example, the shunt voltage regulator may have a current carrying capacity (e.g., a current rating) greater than the maximum current from the current source 102. Therefore, if the DC load 106 stops drawing current (e.g., temporarily, during a start-up sequence, etc.), the shunt voltage regulator 104 can handle both the current that is normally provided to the shunt voltage regulator from the current source 102 as well as the current that would otherwise be used by the DC load if it were conducting current.

Figure 2:
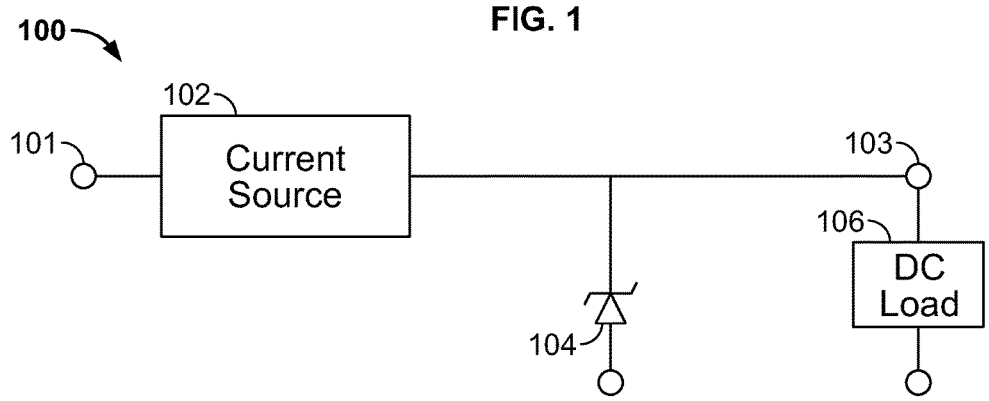
FIG. 2 is a block diagram of an example embodiment of the switching shunt regulator circuit of FIG. 1 wherein the shunt voltage regulator is a zener diode.

FIG. 2 illustrates one example embodiment of the switching shunt regulator circuit 100 of FIG. 1. As shown in FIG. 2, the shunt voltage regulator 104 may be a zener diode. Alternatively, other suitable shunt voltage regulator devices may be employed. For example, a precision shunt voltage regulator may be used for higher accuracy such as, e.g., a TL431 shunt regulator. For higher current levels, a discrete buffer can be used to enhance the current handling capacity of the shunt voltage regulator 104.

Figure 3:
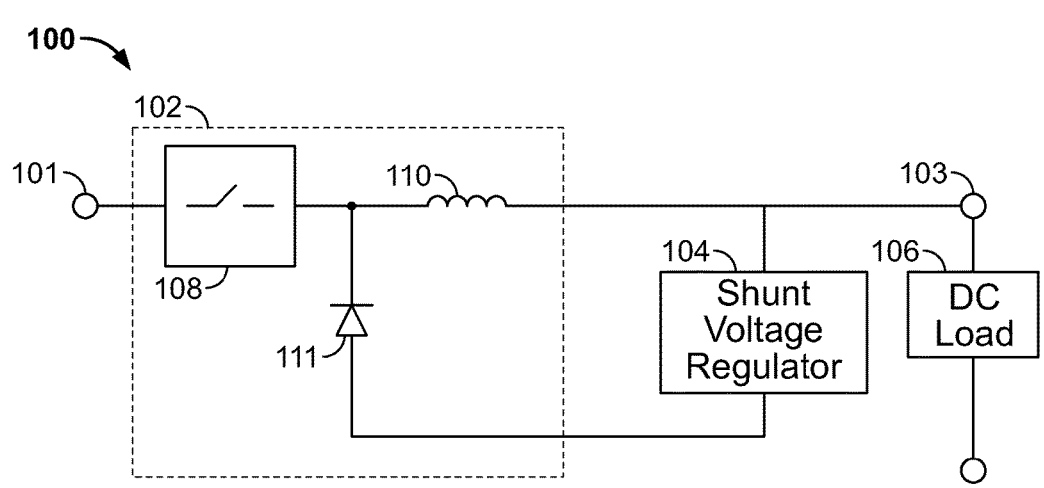
FIG. 3 is a block diagram of an example embodiment of the switching shunt regulator circuit of FIG. 1 wherein the current source includes a switch, an inductor, and a diode.

FIG. 3 illustrates another example embodiment of the switching shunt regulator circuit 100 of FIG. 1. As shown in FIG. 3, the current source 102 may include a switch 108, an inductor 110, and a diode 111. The switch 108 may be turned on when a current through the inductor 110 reaches a lower threshold and turned off when the current through the inductor reaches an upper threshold. The diode 111 may be a freewheeling diode.

The switch 108 may be any suitable switch for applying and removing current from the inductor, such as, for example, a metal oxide semiconductor field effect transistor (MOSFET), a bipolar junction transistor (BJT), etc. When the circuit 100 is energized and the switch 108 is turned on, current may start to ramp up in the inductor 110. When the current though the inductor 110 reaches an upper hysteresis threshold level, the switch 108 may be opened (i.e., turned off). After the switch 108 is opened, current through the inductor 110 may fall from its peak value towards zero, and may freewheel through diode 111. Once the current through the inductor 110 falls to a lower hysteresis threshold level, the switch 108 may be closed (i.e., turned on) again. This cycle may be repeated continuously during operation of the switching shunt regulator circuit 100.

Figure 4:
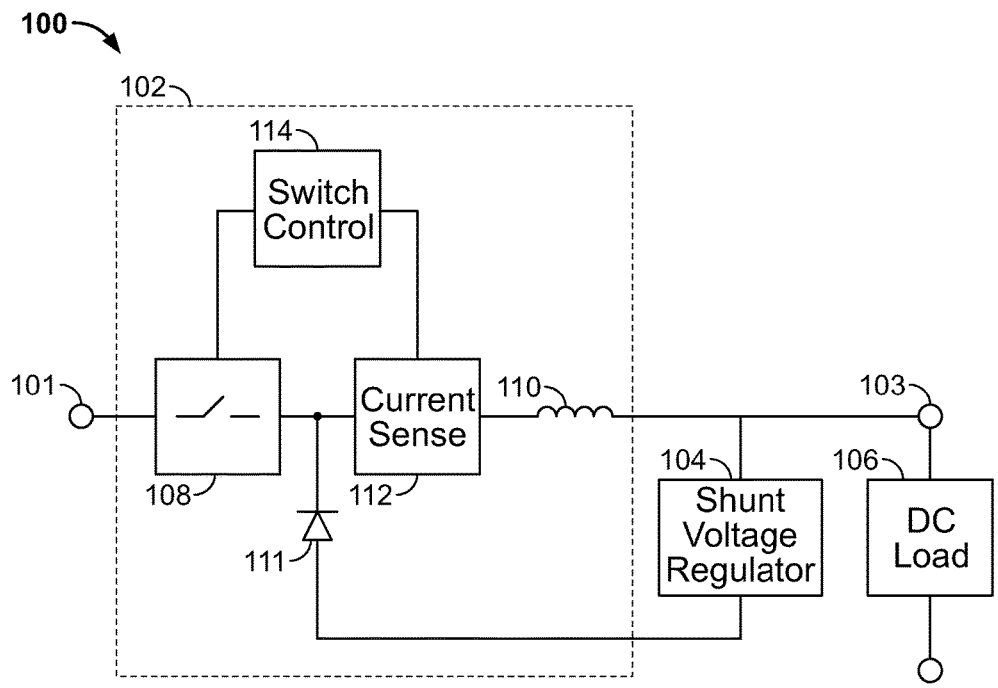
FIG. 4 is a block diagram of an example embodiment of the switching shunt regulator circuit of FIG. 1 wherein the current source includes a switch, an inductor, a diode, a current sense, and a switch control.

FIG. 4 illustrates yet another example embodiment of the switching shunt regulator circuit 100 of FIG. 1. As shown in FIG. 4, the current source 102 may include a current sense 112 coupled to a switch control 114. The current sense 112 may be configured to sense a current flowing through the inductor 110. The switch control 114 may be coupled to the switch 108 and configured to turn on the switch when a sensed current through the inductor 110 reaches a lower hysteresis threshold and turn off the switch 108 when the sensed current through the inductor reaches an upper hysteresis threshold.

The switch control 114 may be any suitable device capable of providing a signal to turn on and turn off the switch 108, such as, for example, a buffer, an amplifier, a microcontroller, etc. The current sense 112 may be any element suitable for detecting the current through the inductor, such as, for example, a current sense resistor, a transformer, a Hall Effect integrated circuit, a Rogowski coil, etc.

Figure 5:
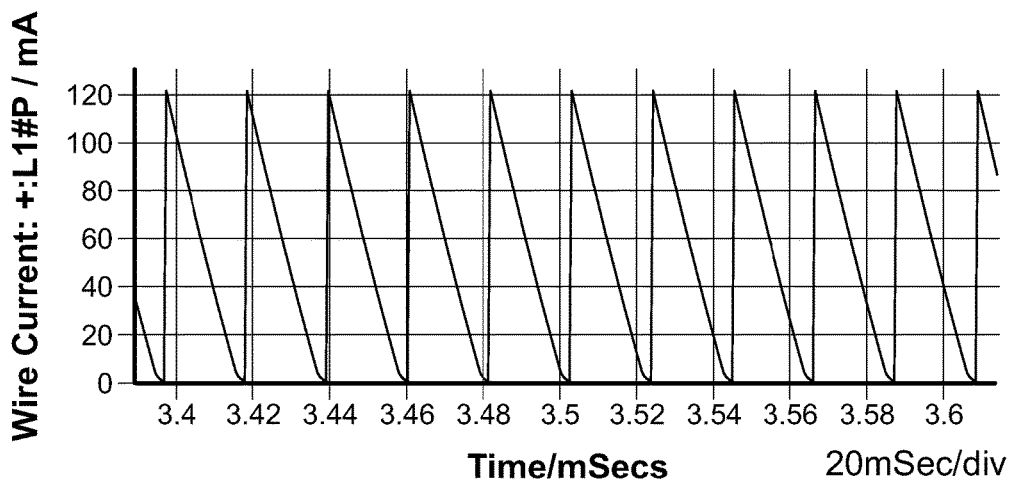
FIG. 5 is a graph of an example current waveform through the inductor of FIG. 4.

The lower hysteresis threshold may be about zero to cause the inductor 110 to operate in boundary mode operation, with the current through the inductor cycling between about zero and a peak value. FIG. 5 illustrates an example current waveform of the inductor 110 of FIG. 4 during such operation. The inductor current is illustrated as operating in boundary mode with a peak current value of about 120 mA and a lower threshold of about zero. The operation of the current may be hysteretic with turn on and turn off at fixed current thresholds in every current cycle.

Figure 6:
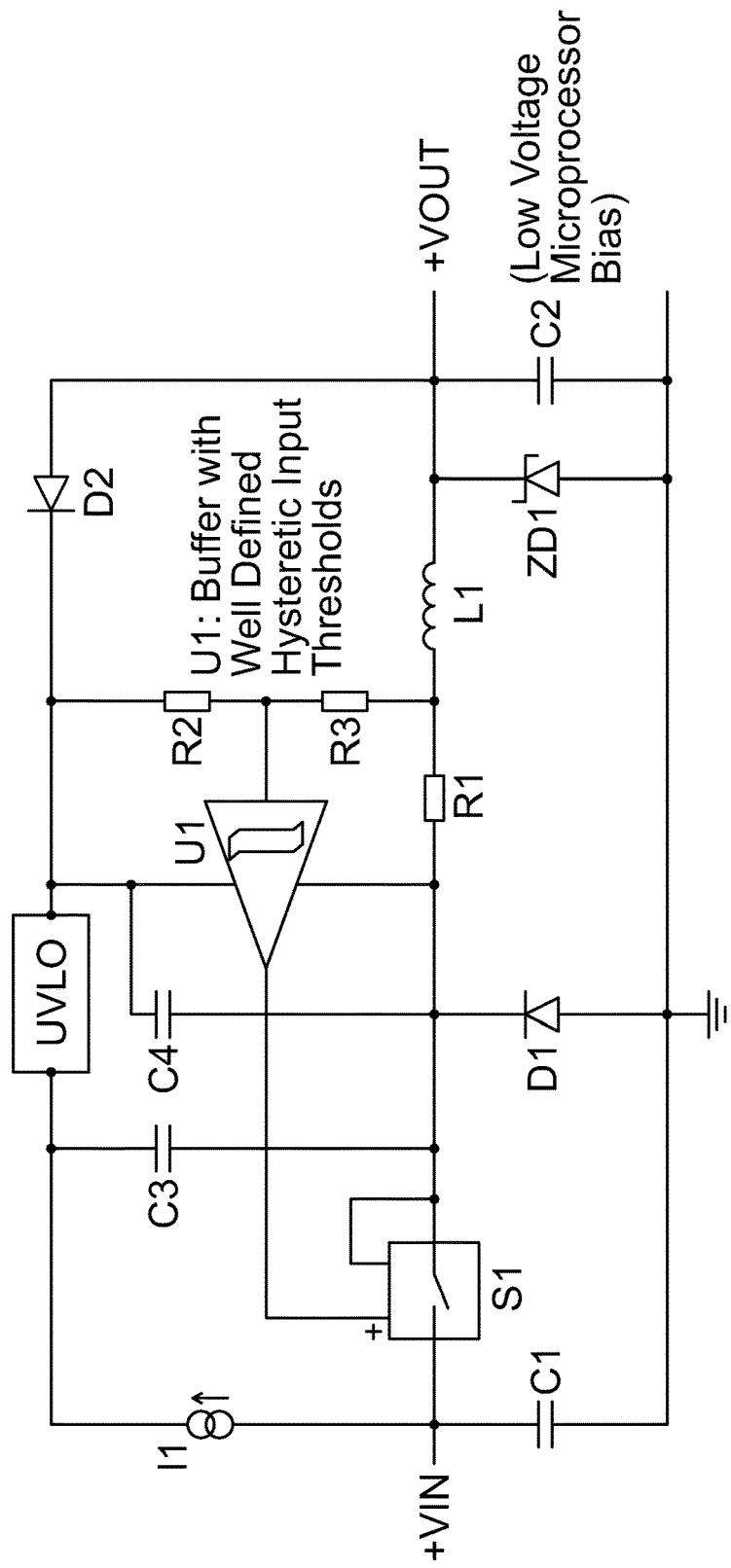
FIG. 6 is a block diagram of an example embodiment of the switching shunt regulator circuit of FIG. 1 wherein the current source includes a buffer.

FIG. 6 illustrates a switching shunt regulator circuit according to another example embodiment of the present disclosure. In this example embodiment, the switch control is a buffer U1. The buffer U1 has a voltage divider coupled to its input. The voltage divider includes resistor R2 coupled between the input of the buffer U1 and the output (+VOUT) of the switching shunt regulator circuit through diode D2. The voltage divider also includes resistor R3 coupled between the input of the buffer U1 and the inductor L1. The buffer U1 may have well defined hysteretic buffer input thresholds. For example, the first hysteretic buffer input threshold may be about 3V and the second hysteretic buffer input threshold may be about 2V. The values of resistors R2 and R3 may be selected such that, upon initialization of the switching shunt regulator circuit, the buffer input voltage is above 3V when there is no current flowing in the inductor L1 and the current sense resistor R1.

Once the bias voltage is available at the high side of the buffer U1, the buffer outputs a high signal to turn on the switch S1 because the starting buffer input voltage is greater than 3V. When the switch S1 is turned on, current starts to ramp up linearly in resistor R1 and inductor L1. While the current through the inductor L1 is ramping up, the voltage at the node between resistor R1 and resistor R3 starts to fall and the voltage at the input of the buffer U1 linearly reduces. At a predetermined inductor current, the voltage at the input of the buffer U1 reaches the second hysteretic buffer input threshold and the buffer outputs a low signal to turn off the switch S1. The inductor current then falls toward ground and current freewheels through the diode D1. The current in the inductor L1 and resistor R1 falls from its peak value towards zero. The first hysteretic buffer input threshold is selected such that the buffer output will go high to turn on the switch once the current through the inductor L1 falls to a predetermined lower level. The predetermined lower level is preferably about zero. The cycle may repeat continuously during operation of the switching shunt regulator circuit.

Boundary mode operation of the switching shunt regulator is sometimes preferred. If the predetermined lower level of inductor current is about zero, boundary mode operation may occur in the switching shunt regulator circuit. Although the preferred lower threshold of inductor current is about zero, boundary mode operation may still occur if the lower threshold of inductor current is slightly above zero. The waveform of the current during boundary mode operation (shown in FIG. 5) has a triangular shape from zero to peak inductor current. The average current during boundary mode operation is half of the peak current value, irrespective of input and output voltages of the switching shunt regulator circuit. If the lower threshold of inductor current is substantially above zero, continuous current mode operation may occur. If the lower threshold of inductor current is about zero and there is a delay before the inductor current is increased above about zero, discontinuous current mode operation may occur.

In the embodiment of FIG. 6, upon application of the input voltage (+VIN), a current source I1 is generated to charge high side bias filter capacitor C3 through resistor R1, inductor L1, capacitor C2 and load circuits, until the voltage across the capacitor C3 reaches a predetermined high level of the under voltage lockout (UVLO) circuit. Once this threshold is reached, the bias supply is applied to the buffer and the switching shunt regulator circuit operation starts. A linear regulator may be used to maintain a fixed bias to the buffer U1 and/or internal circuitry. The current source I1 may be switched on and off at two different predetermined levels. A shunt zener diode may be placed across capacitor C3 to clamp the bias voltage. If the quiescent current of the buffer and the gate charge of switch S1 are low, the required bias power can be generated from the input source without degradation. Other methods of generating control bias power may also be used.

In some example embodiments, current spikes caused by gate drive and parasitic capacitive charging may not be sensed due to the placement of the control circuit and sensing nodes. Therefore, leading edge blanking may not be needed.

In some embodiments, the buffer may have a propagation delay and/or the switch may have a turn off delay. In these cases, the inductor current may continue to rise after reaching the turn off threshold until the switch is turned off. The extra current generated in the inductor is not constant over the entire input voltage range. Because the current ramp up rate in the inductor is higher at high input voltages, the extra current generated in the inductor at high input voltage is more than the extra current generated in the inductor at low input voltages. This may cause an error in the average output current and the output current may not be constant over the entire input voltage range. In some embodiments, the variation in the current may not be very large and may be acceptable. In other embodiments, the switching shunt regulator circuit may be configured to ensure that adequate current is available at the lowest input voltage and the increased current level at the highest input voltage can be dissipated by the shunt voltage regulator.

In some embodiments, more accurate control of the output current may be implemented. For example, the switching shunt regulator circuit may have a line feed forward, such that a DC signal derived from the input source is added to the sensed current to compensate for propagation delays. In other embodiments, the switching shunt regulator circuit may have a current regulation loop that averages the signal developed in the current sense resistor and compares it to a fixed reference. The resulting error may be used to change the turn off threshold of the buffer to compensate for propagation delays.

In some example embodiments, a single MOSFET switch may be used. However, high voltage MOSFETs (>300V) may have a higher gate threshold and may need a drive voltage of 5V or higher. The current source may be configured to use the voltage at the output as a bias supply voltage. Because the bias power for the switch may be derived from the output during a freewheeling period when the output voltage is set to about 3.3V, a high voltage MOSFET may not be suitable for use as the switch.

Figure 7:
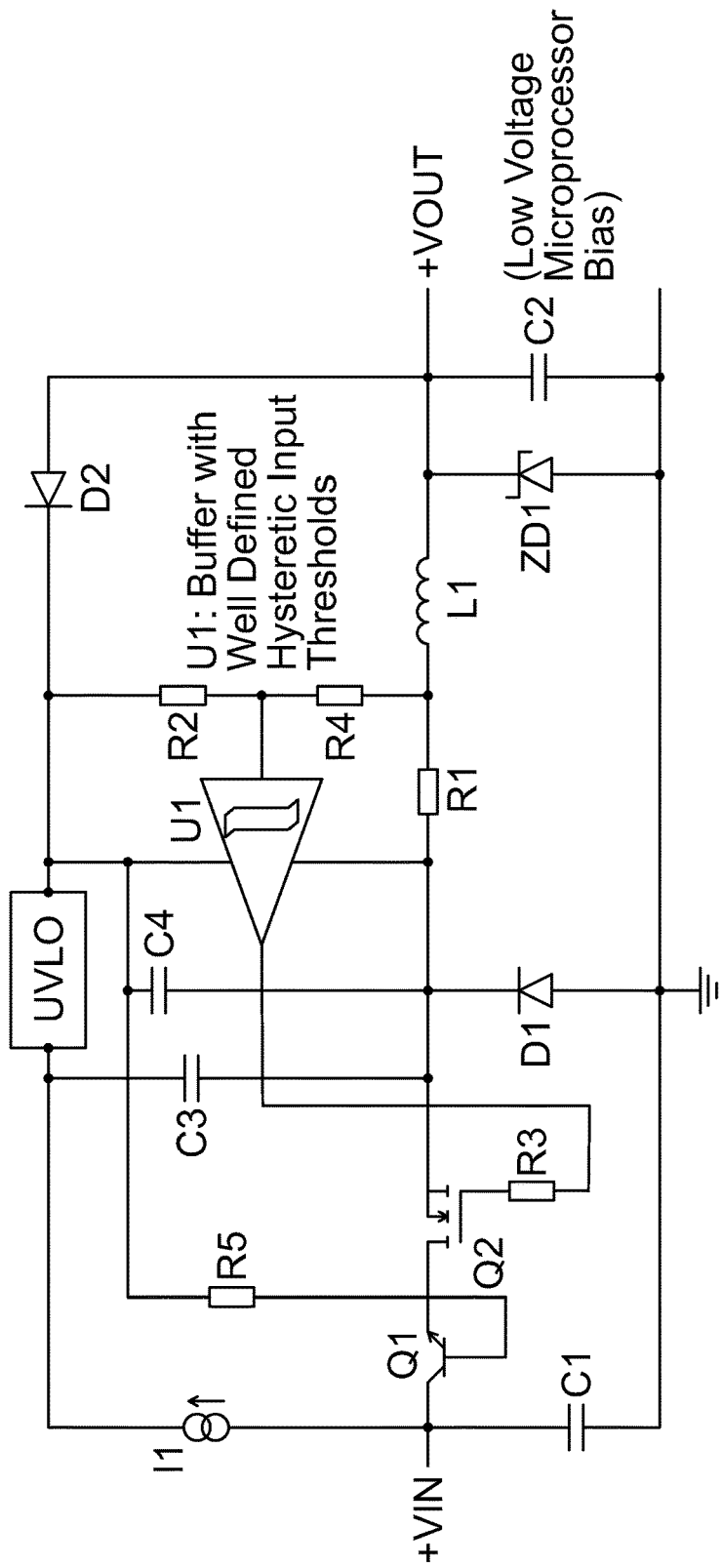
FIG. 7 is a block diagram of an example embodiment of the switching shunt regulator circuit of FIG. 1 including an emitter switched bipolar transistor (ESBT).

FIG. 7 illustrates a switching shunt regulator circuit according to another example embodiment of the present disclosure. As shown in FIG. 7, the switching shunt regulator circuit may include an emitter switched bipolar transistor switch (e.g., cascode) having a BJT Q1 in series with a low voltage MOSFET Q2. The BJT Q1 is driven by a fixed current drawn from the bias supply through resistor R5, while MOSFET Q2 is the control switch driven by the output of the buffer U1. The cascode switch can have a very fast operation and enhanced safe operating area for the BJT Q1. The cascode switch may also provide a lower storage time and delay for the BJT Q1 as compared to other common emitter configurations. Because BJT Q1 is a current driven device, it may be operated down to very low voltages such as approximately 2.5V to 3.3V. The control MOSFET Q2 may have a low voltage rating and a low gate threshold of approximately 1V to 2V. Therefore, the cascode switch may be operated at 3.3V bias. Some example embodiments may use very low power and currents, and can use very low current rated BJTs. Some 600V rated BJTs may be significantly lower in cost than equivalent 600V MOSFETs.

Figure 8:
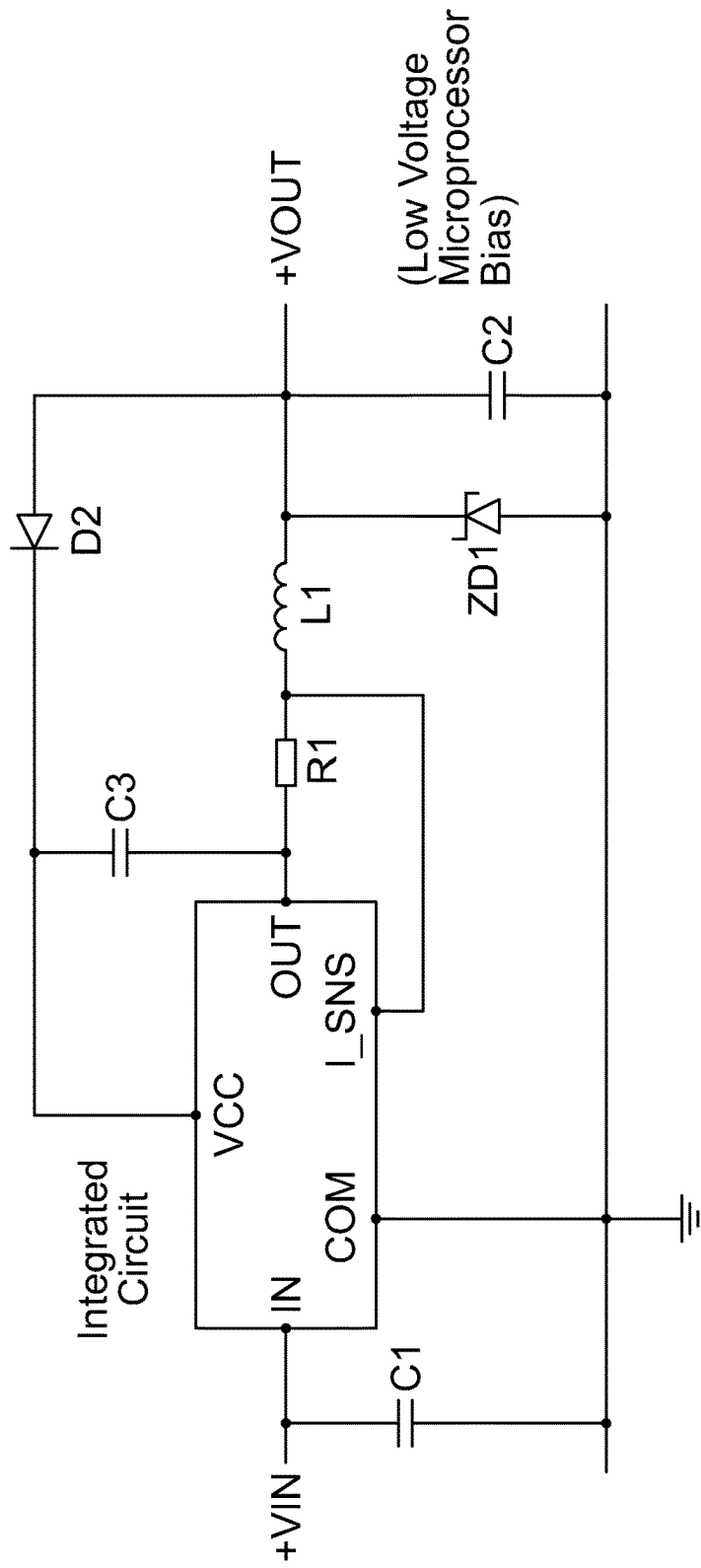
FIG. 8 is a block diagram of an example embodiment of the switching shunt regulator circuit of FIG. 1 wherein a portion of the switching shunt regulator circuit is comprised in an integrated circuit.

FIG. 8 illustrates a switching shunt regulator circuit according to another example embodiment of the present disclosure. As shown in FIG. 8, the switching shunt regulator circuit may include an integrated circuit. For example, the switching shunt regulator circuit may include an inductor, a switch, a buffer and a current sensor, with at least the switch and the buffer comprised in the integrated circuit. In other embodiments, more or less components may be included in the integrated circuit, or located outside of the integrated circuit. In this example embodiment, the inductor L1, shunt voltage regulator ZD1, current sense resistor R1 and filter capacitors (—C1, C2, C3) are external to the integrated circuit, while the buffer, diode and switch are internal to the integrated circuit. Using an integrated circuit in the switching shunt regulator circuit may reduce the total component count of the switching shunt regulator circuit.

Figure 9:
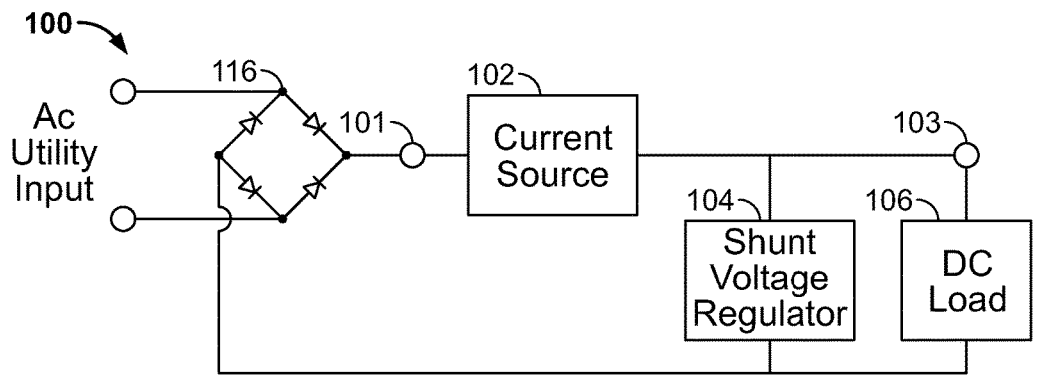
FIG. 9 is a block diagram of an example embodiment of the switching shunt regulator circuit of FIG. 1 wherein the input of the current source is coupled to an output of an AC utility grid through a rectifier.
Figure 10:
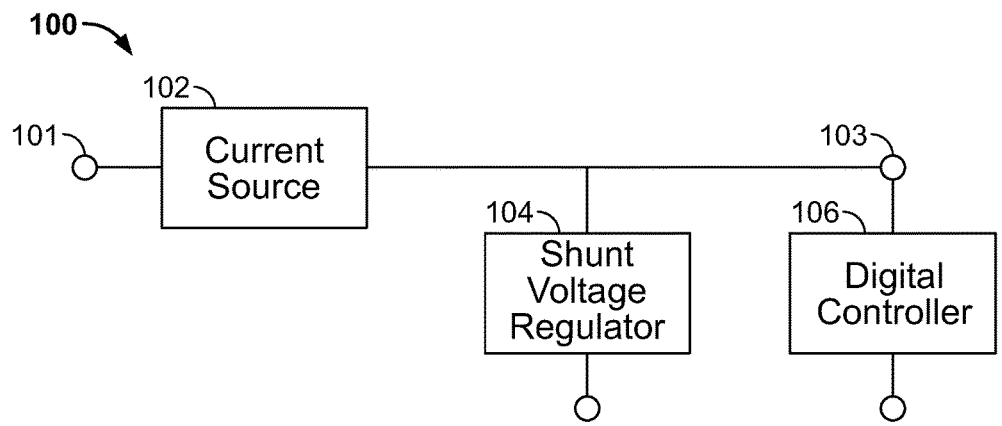
FIG. 10 is a block diagram of an example embodiment of the switching shunt regulator circuit of FIG. 1 wherein the output of the current source is coupled to a digital controller (e.g., a controller for a switched mode power supply).

FIG. 9 illustrates a switching shunt regulator circuit 100 according to another example embodiment of the present disclosure. As shown in FIG. 9, the input 101 of the current source 102 may be coupled to a utility grid supply through a rectifier 116. Although a bridge rectifier is illustrated in FIG. 10, other suitable circuits for converting an AC utility grid supply input voltage to a DC voltage may be used, such as, for example, a half-wave rectifier, a full-wave rectifier, etc. In some embodiments, the utility grid supply may be 115 VAC, 230 VAC, etc.

FIG. 10 illustrates a switching shunt regulator circuit 100 according to another example embodiment of the present disclosure. As shown in FIG. 10, the output 103 of the current source 102 may be coupled to a digital controller 106. The digital controller 106 may be any suitable digital controller, such as, for example, a microprocessor, microcontroller, digital signal processor, integrated circuit chip, etc. The digital controller 106 may be a controller for a switched mode power supply. The switching shunt regulator circuit 100 may allow a low power microprocessor to be directly powered from a utility grid supply. The switching shunt regulator circuit 100 may be part of a digitally controlled switching power supply where a microprocessor needs to be powered first before it takes control of the main power converter. In other embodiments, the switching shunt regulator circuit 100 may be part of any suitable product which needs a controller or microprocessor powered up first before taking control of the operation and where the load current drawn by the microprocessor may have minimum variation throughout its operation. For example, the switching shunt regulator circuit 100 may be part of a low power digital controlled offline power supply, a home appliance such as an air conditioner, rice cooker, dishwasher, microwave oven, an energy meter, wireless controller, intelligent machine that operates from the utility AC input, etc.

In some example embodiments of the present disclosure, the switching shunt regulator circuit may provide a non-isolated stable low voltage bias, such as, for example, 3.3V, directly from a utility grid supply of, for example, 115 VAC, 230 VAC, etc. The switching shunt regulator circuit may be capable of generating only about 10 mA at 3.3V. The switching shunt regulator circuit may use a high side switch operation, and may not use an optocoupler for regulation. The switching shunt regulator circuit may provide low output voltage ripple, and may allow microprocessors to use the output bias voltage as a control reference for analog to digital conversion (ADC). The switching shunt regulator circuit may be capable of providing a 3.3V microprocessor supply voltage without first generating a higher supply voltage (e.g., 5V, 6V, etc.) and then using a linear regulator. The switching shunt regulator may be configured to derive a bias for the switching shunt regulator from the output voltage of the switching shunt regulator during freewheeling.

Figure 11:
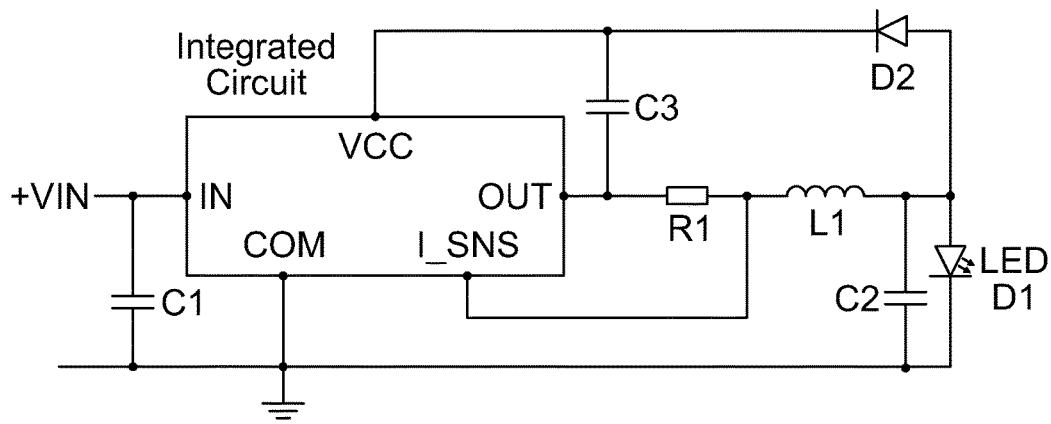
FIG. 11 is a block diagram of an example embodiment of the switching shunt regulator circuit of FIG. 1 wherein a portion of the current source is comprised in an integrated circuit and the output of the current source is coupled to an LED driver.

FIG. 11 illustrates a switching shunt regulator circuit according to another example embodiment of the present disclosure. As shown in FIG. 11, the output of the current source may be coupled to a non-isolated light emitting diode (LED) driver circuit. The current source may be coupled to an offline LED driver to drive the LEDs at constant current. When the output of the current source is coupled to an LED driver, the LED may act as a non-precision shunt regulator, with the LED's forward voltage drop as the output voltage.

The switching shunt regulator may be configured to initialize a digital controller without the need of an auxiliary power converter. The switching shunt regulator circuit may be used in a completely digitally controlled power supply by eliminating analog auxiliary power converter PWM controllers. Upon initialization, the digital controller may be capable of fully controlling an auxiliary converter, as well as other power conversion blocks such as PFC and DC/DC converters. Portions of the switching shunt regulator circuit may be implemented in an integrated circuit. In some example embodiments, hysteretic operation may be achieved by sensing the peak current and valley current through an inductor. In other example embodiments, a cascode switch may be used for low voltage operation.

In some example embodiments, the switching shunt regulator may include an emitter switched bipolar transistor (ESBT) as a control switch. Using an ESBT as a control switch may allow faster operation (e.g., comparable to a MOSFET) while allowing to derive the operating bias voltage from a lower voltage output (e.g., a 3.3V output voltage, etc.).

As should be apparent, any feature of any of the example embodiments may be combined with one or more features of any other example embodiments, without departing from the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switching shunt regulator circuit comprising:
   a current source having an input for receiving an input voltage, an output for providing a DC current to a DC load, a buffer, an inductor and an emitter switched bipolar transistor (ESBT) switch including a bipolar junction transistor (BJT) coupled in series with a metal oxide semiconductor field effect transistor (MOSFET), a base of the BJT arranged to be driven by a current drawn from the output, only the MOSFET arranged to be driven by an output of the buffer, the buffer coupled to receive a bias supply voltage derived from a voltage at the output; and
   a shunt voltage regulator coupled to the output of the current source;
   wherein the buffer is configured to control the MOSFET to operate the inductor in a boundary mode to cycle a current through the inductor between about zero and an upper threshold;
   wherein the current source is configured to provide DC current to the DC load and DC current to the shunt voltage regulator when the DC load is coupled to the output, the DC current to the shunt voltage regulator regulating a voltage at the output of the current source; and
   wherein the shunt voltage regulator has a current carrying capacity greater than the sum of the DC current to the DC load and the DC current to the shunt voltage regulator.

2. The switching shunt regulator circuit of claim 1 wherein the buffer is a switch control, the switch control configured to turn on the MOSFET when the current through the inductor reaches about zero and turn off the MOSFET when the current through the inductor reaches the upper threshold.

3. The switching shunt regulator circuit of claim 2 wherein the current source includes a current sense coupled to the switch control, the current sense configured to sense the current through the inductor, the switch control coupled to the MOSFET and configured to turn on the MOSFET when the sensed current through the inductor reaches about zero and turn off the MOSFET when the sensed current through the inductor reaches the upper threshold.

4. The switching shunt regulator circuit of claim 3, further comprising a line feedforward connection from the input to the switch control, the switch control configured to add a DC signal derived from the input to the sensed current through the inductor to compensate for a propagation delay.

5. The switching shunt regulator circuit of claim 3, wherein the switch control includes a current regulation loop that averages a signal from the current sense, compares the averaged signal to a fixed reference, and uses a resulting error to change the upper threshold for switch turn off to compensate for a propagation delay.

6. The switching shunt regulator circuit of claim 2 wherein the buffer includes a high input hysteresis threshold and a low input hysteresis threshold.

7. The switching shunt regulator circuit of claim 1 wherein the switching shunt regulator circuit is a non-isolated circuit.

8. The switching shunt regulator circuit of claim 1 further comprising the inductor, a diode, and a current sense, the buffer including a high input hysteresis threshold and a low input hysteresis threshold.

9. The switching shunt regulator circuit of claim 8 wherein at least the ESBT switch, the diode, and the buffer are comprised in an integrated circuit.

10. The switching shunt regulator circuit of claim 1 wherein the current source includes an integrated circuit.

11. The switching shunt regulator circuit of claim 1 wherein the shunt voltage regulator comprises a zener diode.

12. The switching shunt regulator circuit of claim 1 wherein the MOSFET has a lower voltage rating than the BJT.

13. A voltage regulating circuit comprising:
   an input for receiving a DC input voltage;
   an output for providing a DC output voltage;
   an inductor coupled to the output;
   a buffer;
   an emitter switched bipolar transistor (ESBT) switch coupled in series between the input and the inductor, the ESBT switch including a bipolar junction transistor (BJT) coupled in series with a metal oxide semiconductor field effect transistor (MOSFET), a base of the BJT arranged to be driven by a current drawn from the output, only the MOSFET arranged to be driven by an output of the buffer, the buffer coupled to receive a bias supply voltage derived from the DC output voltage;
   a shunt voltage regulator coupled in parallel with the output; and
   a current sense coupled between the inductor and the buffer, the buffer configured to turn on the MOSFET when a sensed current though the inductor reaches about zero, and to turn off the MOSFET when the sensed current through the inductor reaches an upper threshold, to operate the inductor in a boundary mode.

14. The voltage regulating circuit of claim 13, wherein the shunt voltage regulator comprises a zener diode.

15. A method of controlling a switching shunt regulator circuit having an input and an output, an inductor coupled to the output, a buffer, an emitter switched bipolar transistor (ESBT) switch coupled in series between the input and the inductor, and a shunt voltage regulator coupled in parallel with the output, the ESBT switch including a bipolar junction transistor (BJT) coupled in series with a metal oxide semiconductor field effect transistor (MOSFET), a base of the BJT arranged to be driven by a current drawn from the output, only the MOSFET arranged to be driven by an output of the buffer, the buffer coupled to receive a bias supply voltage derived from a voltage at the output, the method comprising:

sensing a current through the inductor;
turning on the MOSFET, by the buffer, when the sensed current reaches about zero to operate the inductor in a boundary mode;
turning off the MOSFET, by the buffer, when the sensed current reaches an upper input threshold; and
regulating a DC output voltage at the output using the shunt voltage regulator.

16. The method of claim 15, wherein regulating the DC output voltage includes regulating the DC output voltage at the output by providing excess current from the inductor to the shunt voltage regulator.

\* \* \* \* \*